United States Patent

[11] 3,571,725

[72] Inventors Hisashi Kaneko;
Tatsuo Ishiguro, Tokyo, Japan

[21] Appl. No. 731,197
[22] Filed May 22, 1968
[45] Patented Mar. 23, 1971

[73] Assignee Nippon Electric Company, Limited
Shiba Gochome Minato-ku, Tokyo, Japan

[32] Priority May 25, 1967
[33] Japan
[31] 42/33798

[54] MULTILEVEL SIGNAL TRANSMISSION SYSTEM
5 Claims, 3 Drawing Figs.

[52] U.S. Cl. .......... 328/14, 307/215, 307/229, 307/268, 328/93, 328/104, 328/119, 340/347
[51] Int. Cl. .......... H03k 5/00
[50] Field of Search .......... 307/208, 215, 229, 235, 268; 328/14, 93, 94, 104, 139, 138, 187, 119; 340/347 (DA)

[56] References Cited
UNITED STATES PATENTS
3,267,459 8/1966 Chomicki et al. .......... 340/347

*Primary Examiner*—Donald D. Forrer
*Assistant Examiner*—John Zazworsky
*Attorney*—Hopgood and Calimafde

ABSTRACT: A transmission system is described for transmitting a plurality of two-level pulse trains of arbitrary synchronization over a common signal path. A pair of pulse trains of varying pulse lengths are applied to a digital network which produces a binary equivalent of the condition of the input pulse trains at any time. The binary count from one pulse train occupies a different order, by a multiple of two, from that of the other pulse train. An analogue equivalent of the binary output is generated to provide a composite signal. After suitable modulation and demodulation, the original pulse trains are reconstructed by passing the composite waveform through several amplitude discriminators which with further digital circuitry accurately reconstruct the waveforms. General approaches are disclosed.

INVENTORS
HISASHI KANEKO
TATSUO ISHIGURO
BY
Hopgood & Calimafde
ATTORNEYS

INVENTORS
HISASHI KANEKO
TATSUO ISHIGURO
BY
Hopgood & Calimafde
ATTORNEYS

INVENTORS
HISASHI KANEKO
TATSUO ISHIGURO
BY
Hopgood & Calimafde
ATTORNEYS

MULTILEVEL SIGNAL TRANSMISSION SYSTEM

This invention relates to a multilevel transmission system for transmitting two or more 2-valued or binary signals in the form of a multilevel signal.

It is the common practice in transmission of a synchronous binary signal to convert it into a multilevel signal at the transmitter end, and to discriminate at the receiver end the multilevel amplitudes of the received signal on the basis of appropriate timing to reproduce the original binary signal.

On the contrary, when the signal to be transmitted is an asynchronous 2-valued signal, such a facsimile signal, the multilevel transmission is not used, because the level transitions or changes (0 to 1 or vice versa) occur at indefinite timing. Although the multilevel transmission of the asynchronous binary signal may be made possible by converting the asynchronous signal into a synchronous signal, such conversion inevitably entails a shift in time point of level transition.

The object of the present invention is therefore to provide a system for transmitting a plurality of 2-valued signals in the form of an asynchronous multilevel signal. More particularly, this invention is intended to provide an unsynchronized multilevel signal-transmission system wherein the two or more input binary signals are summed up with the appropriate weight added to each of the input binary signals, wherein the transmitted multilevel signal is continuously amplitude-discriminated at the receiver side to reproduce the binary signals corresponding to the original binary signals, and wherein undesired signal components contained in each reproduced binary signal due to the level changes in the associated channels are cancelled by suitable logic circuits.

According to the present invention, the precise demodulation is realized, particularly when the level transitions occur in only one channel. Therefore, the present transmission system is particularly effective for such an asynchronous binary signal as a facsimile signal having a rather small number of level transition points.

It is therefore a further object of this invention to provide a system for transmitting and receiving a plurality of two-level pulse trains of arbitrary synchronization over a common signal path.

The invention will be explained with reference to the accompanying drawings, in which.

Figure 1:
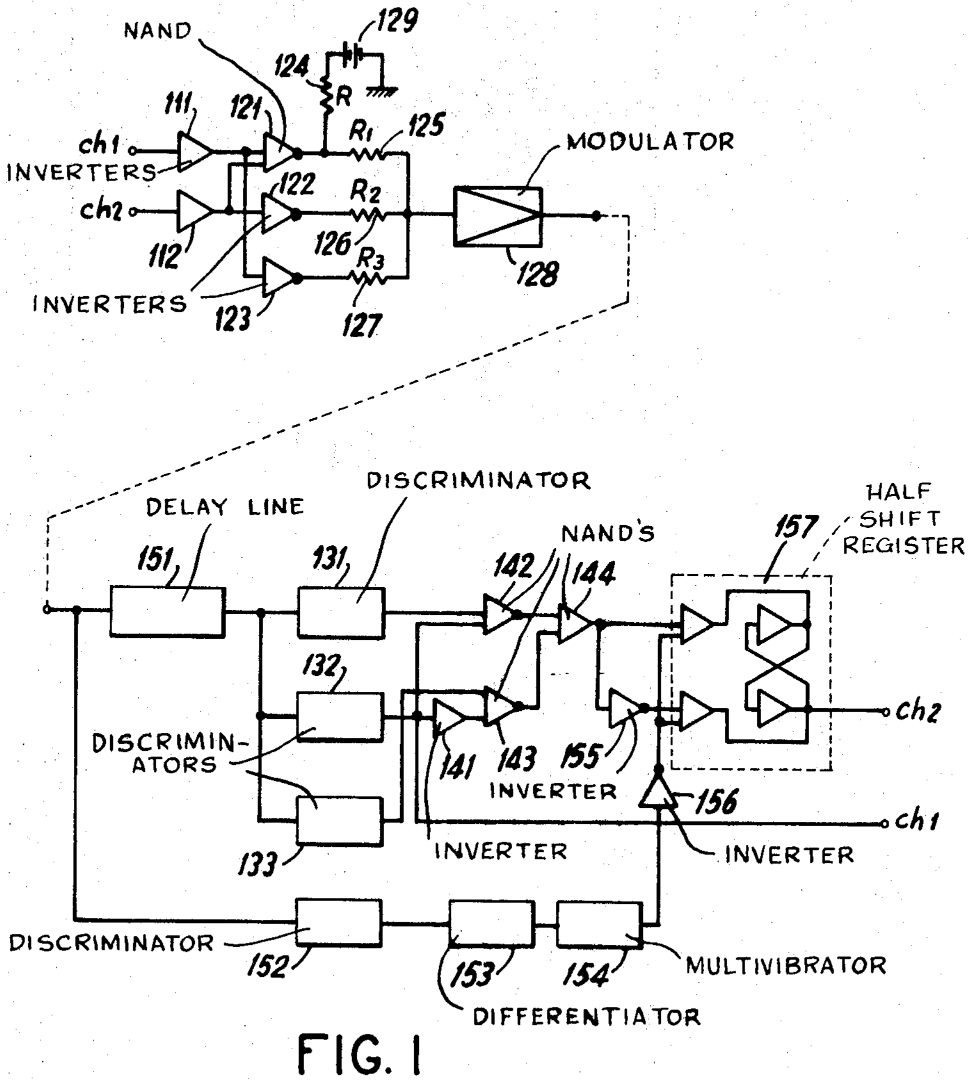
FIG. 1 is a circuit diagram of an embodiment of the present invention.
Figure 2:
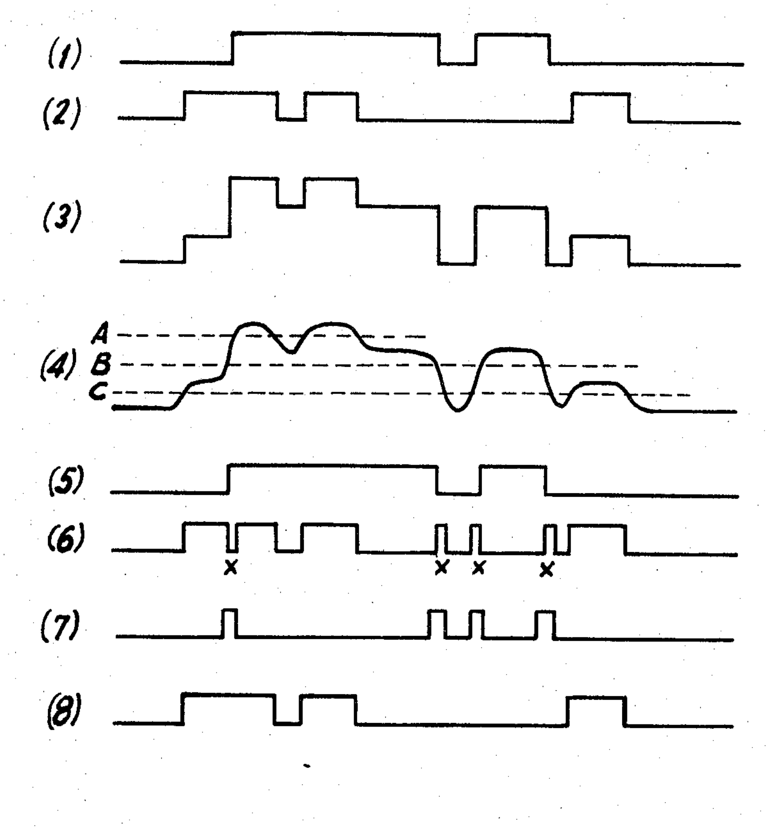
FIG. 2 is a set of waveform diagrams for explaining the operation of the circuit of FIG. 1.

An embodiment of the present invention will be discussed hereinunder assuming the transmission of two binary signals in the form of a four-level signal. Two input binary signals are as shown in FIG. 2 (1) and (2). (In the following, the references (1) and (2) signify the channel numbers.)

The binary signals (1) and (2) are applied to waveform-shaping circuits 111 and 112, respectively, for polarity inversion and waveform shaping. The output of circuit 111 is applied to the NAND circuit 121, and polarity -inverter circuit 123, while that of the circuit 112 is lead to the NAND circuit 121 and polarity-inverter circuit 122. To the output of the NAND circuit 121 a power supply 129 of voltage E is connected through a resistor 124 having resistance R. Also, the outputs of these circuits 121, 122 and 123 are connected in common respectively through resistors 125, 126 and 127. Thus, the outputs of these circuits are zero volts when all their inputs are 1, while they are in the open-circuit state when at least one of them is 0. These outputs are supplied respectively through resistors 125, 126 and 127 to a modulator 128, the input impedance of which is sufficiently large as compared with the resistances R, $R_1$, $R_2$ and $R_3$ of the resistors 124, 125, 126 and 127.

When the signal levels of the channels (1) and (2) are each 1, the outputs of the circuits 111 and 112 are $o$, with the result that all the outputs of the circuits 121, 122 and 123 are left in the open state. In contrast, when the levels of the channels (1) and (2) are 1 and 0, respectively, only the output of the circuit 122 is zero volts. Furthermore, when they are 0 and 1, respectively, only the output of the circuit 123 is zero volts. Finally, when both the levels are 0, all the outputs of the circuits 121, 122 and 123 are zero volts. Inasmuch as the resistors 124, 125, 126 and 127 are given such resistances R, $R_1$, $R_2$ and $R_3$ as satisfy the relationship:

$$R_2/(R+R_1+R_2)=2/3$$

and $$R_3/(R+R_1+R_3)=1/3,$$

the input voltages to the modulator 128 are E, 2E/3 and E/3, and 0, respectively, corresponding to the inputs 1, 1; 1, 0; 0, 1; and 0, 0 to the channels (1) and (2). Thus, as a result of processing the input signals to the channels (1) and (2) shown in FIGS. 2 (1) and 2 (2), a 4-valued or 4-level signal having, as shown in FIG. 2 (3), the uniform level difference, is produced, which signal is the summation of the doubled amplitude of the signal (1) and the amplitude of the signal (2). The 4-valued amplitude-modulated signal is caused to modulate a carrier wave at the modulator 128, and then transmitted. The carrier modulation may be any one of the conventional types such as sideband amplitude modulation, frequency modulation, 4-phase phase shift modulation and the like. The leading and trailing edges of the transmitted waveform 3 become distorted, as shown in FIG. 2 (4), after passing through the bandwidth-limited transmission line.

The received 4-valued signal (FIG. 2 (4) ) is subjected to time delay by $\tau$ second by a delay line 151 and then applied to the amplitude discriminators 131, 132 and 133 having the threshold levels A, B and C, respectively. (See FIG. 2 (4). ) Each of these amplitude discriminators may be any known circuit of this kind including a Schmitt circuit, Esaki diode and the like. Thus, the output of the amplitude discriminator 131 is 1 only when the amplitude of its input signal is larger than the threshold level A. Similarly, the discriminators 132 and 133 produce output 1 only when the input signals thereto exceed the threshold levels B and C, respectively.

Because of the doubling process at the transmitter before summation, the level transitions in the channel (1) unfailingly cause skip of two discrimination levels A, B and C. In other words, the transitions in levels of channel (1) among the level transition of the 4-valued signal (4) are sensed as a component skipping over the medium threshold level B. On the contrary, the level transitions in the channel (2) are extracted resorting to the fact that they skip across only the threshold level A or C. Therefore, the output of the amplitude discriminator 132 having threshold at level B is as shown in FIG. 2 (5), which corresponds to the signal of the channel (1). As for the signal of the channel (2), the outputs of the amplitude discriminators 131 and 133 are selectively extracted by inverter circuit 141 and NAND circuits 142 through 144, in response to the levels 1 and 0, respectively of the channel (1) component. For this purpose, the outputs of amplitude discriminators 131 and 132 are applied to NAND circuit 142, whereas the outputs of discriminator 133 and that of inverter circuit 141, which is employed for inverting the output of discriminator 132, are supplied to another NAND circuit 143. Thus, when the channel (1) is in the 1 state, NAND circuit 142 becomes conductive. On the other hand, when the channel (1) is in the 0 state, NAND circuit 143 turns to the conductive state. The outputs of these NAND circuits 142 and 143 are applied to NAND circuit 144, which is for inverting its inputs to produce the channel (2) signal as shown in FIG. 2 (6). It should be noted here that the channel (2) component contains the undesired extraneous pulse components designated in FIG. 2 (6) by symbol $x$, which are not contained in the original signal of the channel (2). These components $x$ are introduced due to the fact that the level transitions of the channel (1) skipping over the threshold level B inevitably accompany the skipping from level A to B, B to C, or vice versa, which is sensed as a level change in channel (2). These undesired components $x$ can be eliminated by a process to be described hereinunder.

The components $x$ immediately follow the level transitions in channel (1) component and last for one-half of the rise time of each level-changing point of the channel (1) component. To eliminate such components $x$, an elimination pulse having, as shown in FIG. 2 (7), the width $2\tau$ (approximately equal to the above-mentioned rise time) is generated in synchronism with the undesired components $x$. For generating such elimination or cancelling pulse (FIG. 2 (7) ), the received 4-valued pulse is amplitude-discriminated by an amplitude discriminator 152 having the threshold level B, and then time-differentiated by a differentiation circuit 153. The differentiated output from the circuit 153 triggers a monostable multivibrator 154, which in turn generates a pulse having width $2\tau$. Inasmuch as the output of the amplitude discriminator 152, which coincides with each level change in channel (1), is $\tau$ second in advance of those from the discriminators 131, 132, and 133 (because of the direct connection between the 4-valued input terminal and the discriminator 152 and not through delay line 151), the output of the multivibrator 154 having width $2\tau$ second unfailingly coincides with the components $x$. The reference numeral 157 indicates a half-shift register composed of two NAND circuits and two polarity inverter circuits. The output of multivibrator 154 is supplied through polarity inversion circuit 156 in parallel to two input-side NAND circuits of register 157. Also, the output of NAND circuit 144 is supplied to the two input-side NAND circuits of register 157, directly and through polarity-inverter circuit 155, respectively. Thus, the half-shift register 157 allows the input signal to pass therethrough when the cancelling pulse from the multivibrator 154 is 0, while it rejects the level change during the time period $2\tau$ defined by the cancelling pulse. Thus, the undesired pulse components shown in FIG. 2(6) are eliminated to reproduce the channel (2) signals, as shown in FIG. 2(8).

As mentioned above, according to the invention, two asynchronous binary signals can be transmitted in the form of a 4-valued multilevel signal. Since the conversion into the 4-valued multilevel signal is realized only by summing two binary signals after one of them is given weight to become twice as great as the amplitude of the other, the frequency bandwidth occupied by this 4-valued signal may be equal to that for transmitting the two original binary signals. Therefore, it may be said that the effective use of the transmission line has become possible.

Although this case has so far been described in conjunction with the case where two input 3-valued signals are converted into one 4-valued signal, it will be easily understood that this system is applicable in general to $n$-channel 2-valued signals. In such a case, a $2^n$-valued multilevel signal is produced at the transmitter by giving the weights 1, 2, $2^2$, ......, $2^{n11}$ to the channel signals, respectively, and summing the weighted amplitudes. At the receiver, the similar amplitude discrimination and the waveform processing are performed by a number of amplitude discriminators, separator circuits and logic circuits. The choosing of the weight of the amplitude of each channel to be a multiple of 2 is intended to take advantage of the fact that the level differences can be made uniform. Therefore, the weight may be determined in any other way. As for the receiver, the magnitudes and number of the threshold levels of the amplitude discriminators; means for deriving the multiplexed 2-valued signal; logic circuits for eliminating the undesired components $x$; and means for demodulating the binary signal are not restricted to those of the above-mentioned embodiment. Furthermore, the wave-shaping circuits, summing circuits, amplitude discriminator circuits, separator circuits and gate circuits may be replaced by any circuit means of similar property.

Figure 3:
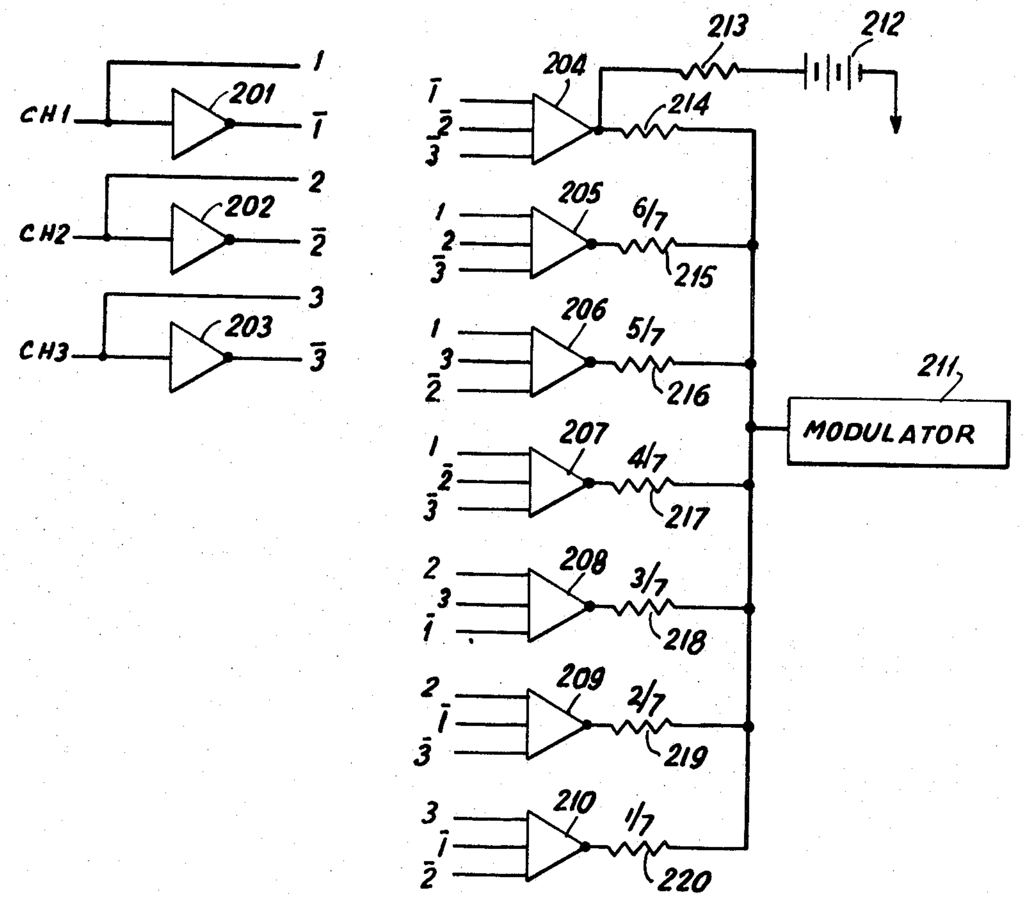
FIG. 3 schematically illustrates a modulator for combining three channels of arbitrary bilevel pulses in a single multilevel amplitude modulated signal in accord with one aspect of the invention.

FIG. 3 shows an extension of a modulator circuit wherein three channels of arbitrary bilevel pulses and of arbitrary synchronization are combined in a single multilevel amplitude-modulated signal.

The channels 1, 2 and 3 respectively are coupled to inverters 201—203 to provide six signals for producing distinct levels of modulation. Combinations of three of these signals are then selected to actuate the NAND circuits 204—210. These combinations are so selected as shown in the FIG. 3 that either only one of the outputs of the NAND circuits is zero or all of them are rendered zero. The outputs of the NAND circuits 204—210 are coupled through resistors 214—220 to a common output and a fixed voltage source 212 is applied through resistor 213 to the output of NAND circuit 204.

The resistor values 213—220 are so selected that if for instance NAND circuit 205 output is rendered zero volts then the output voltage to modulator 211 is 6/7 of the open-circuit voltage E. Similarly, the outputs of NAND circuits 206 to 210 respectively produce 5/7, 4/7, 3/7, 2/7 and 1/7 of the open-circuit voltage E. It should further be realized that other AND circuits may be used, in which case the combination of the three bilevel inputs will be correspondingly changed.

We claim:

1. A signal conditioner for transmitting a plurality of two-level pulse trains of arbitrary synchronization over a common signal path comprising in combination, means responsive to $n$ number of two-level pulse trains for generating $2^n$ binary digital outputs representative of the binary equivalent of said $n$ pulse trains at any time, with the levels of any one pulse train modifying the binary output by an integral multiple of two, and with each of said pulse trains modifying a different order of the binary digital outputs, means responsive to said digital outputs for providing weighted analogue equivalent signals thereof and summing said analogue signals to produce a composite analogue signal, receiver means having $2^n$—1 amplitude discriminator circuits responsive to the composite analogue signal for producing $2^n$—1 two-level signals when said composite signal exceeds preselected different threshold levels in said discriminator circuits, and means responsive to the two-level signals for reconstructing the first and second pulse trains, said reconstructing means further including means for delaying said composite signal a preselected time, means responsive to the transitions in said composite signal for producing a pulse of preselected duration, and means applying said pulse to selected two-level signals from selected discriminators for blanking selected transitions in said selected two-level signals.

2. The device as recited in claim 1 wherein said digital output generating means includes, $2^n$ inverter circuits, each having an input coupled to one of the $n$ pulse trains for producing inverted pulse trains $2^n$—1 NAND circuits having their inputs selectively coupled to the pulse trains.

3. A communication system for transmitting a plurality of pulse trains of arbitrary synchronization over a common signal path comprising in combination, means responsive to a first and a second of said pulse trains for generating a multilevel composite signal having amplitude transitions of a first magnitude corresponding width transitions in said first pulse train and transitions of a second magnitude smaller than said first magnitude by a preselected amount corresponding to transitions of said second pulse train, means including a plurality of amplitude discriminator circuits responsive to the composite signal for producing a plurality of two-level signals when said composite signal exceeds preselected different threshold levels in said discriminator circuits, means responsive to the two-level signals for reconstructing the first and second pulse trains, said reconstructing means further comprising means responsive to the reconstructed pulse train from said one discriminator and said second two-level signal for producing a first partially-reconstructed pulse train, means responsive to the reconstructed pulse train from said one discriminator and said third two-level signal for producing a second partially-reconstructed pulse train, delay means for delaying said composite signal a preselected time, means responsive to the transitions in said composite signal for producing a pulse of preselected duration, and means responsive to said first and second partially-reconstructed pulse trains and said pulse of preselected duration for blanking selected transitions in said partially-reconstructed pulse trains and producing the other reconstructed pulse train.

4. The device as recited in claim 3 wherein a first one of said discriminators produces a first two-level signal indicative of one of the reconstructed pulse trains when said composite signal exceeds a second selected level and wherein a pair of said discriminators produces second and third two-level signals representative respectively when said composite signal exceeds a first level lower than said second level and when said composite signal exceeds a third level higher than said second level.

5. The device as recited in claim 3 wherein the amplitude transitions of the first magnitude are greater than the transitions of the second magnitude by a ratio comprising an integral number of two.